US012536850B2

(12) United States Patent
Akima et al.

(10) Patent No.: US 12,536,850 B2
(45) Date of Patent: Jan. 27, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Satoshi Akima, Nagakute (JP); Shuji Miyai, Toyota (JP); Yasuyuki Kamezaki, Toyota (JP); Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/495,233

(22) Filed: Oct. 26, 2023

(65) Prior Publication Data

US 2024/0249569 A1 Jul. 25, 2024

(30) Foreign Application Priority Data

Jan. 24, 2023 (JP) ................................ 2023-008466

(51) Int. Cl.
*G07C 5/08* (2006.01)

(52) U.S. Cl.
CPC ......... *G07C 5/0808* (2013.01); *G07C 5/0825* (2013.01)

(58) Field of Classification Search
CPC .... G07C 5/0808; G07C 5/0825; G07C 5/008; G07C 5/0816; B60R 16/023; H04L 67/12
See application file for complete search history.

(56) References Cited

U.S. PATENT DOCUMENTS

2022/0289204 A1 9/2022 Manabe

FOREIGN PATENT DOCUMENTS

| | | | | |
|---|---|---|---|---|
| JP | 2006209455 | A | * | 8/2006 |
| JP | 2010231776 | A | * | 10/2010 |
| JP | 2011159215 | A | * | 8/2011 |
| JP | 2011-180781 | A | | 9/2011 |
| JP | 2011-186867 | A | | 9/2011 |
| JP | 2013-117998 | A | | 6/2013 |
| JP | 2022-138727 | A | | 9/2022 |

* cited by examiner

*Primary Examiner* — Rufus C Point
(74) *Attorney, Agent, or Firm* — SoraIP, Inc.

(57) ABSTRACT

A control unit provided in an information processing device executes driving diagnosis of a vehicle for a plurality of items in a predetermined period, obtains a score for each of the plurality of items, and performs driving diagnosis among the plurality of items. Determining a comprehensive evaluation according to the number of items whose diagnostic results are equal to or less than a predetermined score; displaying the comprehensive evaluation on an initial screen of a user interface that displays the results of the driving diagnosis; and displaying the evaluation for each of the plurality of items on another screen associated with.

7 Claims, 4 Drawing Sheets

INFORMATION PROCESSING DEVICE AND INFORMATION PROCESSING METHOD

CROSS-REFERENCE TO RELATED APPLICATION

This application claims priority to Japanese Patent Application No. 2023-008466 filed on Jan. 24, 2023, incorporated herein by reference in its entirety.

BACKGROUND

1. Technical Field

The present disclosure relates to an information processing device and an information processing method.

2. Description of Related Art

A technique is known in which a physical quantity that changes based on at least one of traveling, steering, and braking of a vehicle or a physical quantity that changes when a predetermined operation member is operated is detected, and a score of a driving operation is calculated based on a detected value (for example, Japanese Unexamined Patent Application Publication No. 2022-138727 (JP 2022-138727 A)).

SUMMARY

The present disclosure provides a result of a driving diagnosis when a user drives a vehicle.

An aspect of the present disclosure is an information processing device including a control unit that executes:

- executing a driving diagnosis of a vehicle for a predetermined period of time for a plurality of items and obtaining a score for each of the items;
- determining a comprehensive evaluation depending on, among the items, the number of items with a predetermined score or less in a diagnosis result of the driving diagnosis; and
- causing the comprehensive evaluation to be displayed on an initial screen of a user interface that displays a result of the driving diagnosis, and causing an evaluation for each of the items to be displayed on another screen associated with the initial screen.

Another aspect of the present disclosure is an information processing method in which a computer executes:

- executing a driving diagnosis of a vehicle for a predetermined period of time for a plurality of items and obtaining a score for each of the items;
- determining a comprehensive evaluation depending on, among the items, the number of items with a predetermined score or less in a diagnosis result of the driving diagnosis; and
- causing the comprehensive evaluation to be displayed on an initial screen of a user interface that displays a result of the driving diagnosis, and causing an evaluation for each of the items to be displayed on another screen associated with the initial screen.

Another aspect of the present disclosure provides a program for causing a computer to execute the above-described information processing method, or a storage medium that non-temporarily stores the program.

According to the present disclosure, it is possible to provide the result of the driving diagnosis when the user drives the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the conventional driving diagnosis system, when evaluating a plurality of items, the evaluation results of these plurality of items are listed. In this case, it is difficult for the user to understand the evaluation results whether the evaluation results of all the items are checked.

Therefore, an information processing device, which is one aspect of the present disclosure, includes a control unit that performs driving diagnosis of a vehicle for a plurality of items in a predetermined period, obtains a score for each of the plurality of items, Determining a comprehensive evaluation according to the number of items for which the diagnosis result of the driving diagnosis is equal to or less than a predetermined score; and displaying driving diagnosis results for each of a plurality of items on another associated screen.

The predetermined period is, for example, a period of days, weeks, months, seasons, years, or the like. The predetermined time period may be a period of multiple units, such as multiple days, multiple weeks, or multiple years. Also, the predetermined period may be an arbitrarily determined period such as traffic safety week, year-end/new year holidays, or the like.

Vehicle driving diagnosis is a process of evaluating a user's driving with respect to a plurality of items based on information about the user's driving. The information about the user's driving is, for example, sensor output values transmitted from the vehicle. The plurality of items is, for example, items related to safety, economic efficiency, etc. Specifically, they are sudden acceleration, sudden deceleration, sudden steering, excessive speed, short-time turn signals, and the like.

The result of driving diagnosis may be displayed as a diagnosis report. The diagnostic report may include messages and the like corresponding to predetermined events.

A diagnostic report is created for each predetermined period. Note that the diagnostic report may be created at other timings such as every trip. A trip is a unit of running from when the system power of the vehicle is turned on to when the system power is shut off. In addition, in a vehicle equipped with an engine, the running from the start of the engine to the stop of the engine may be regarded as one unit.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

Figure 1:
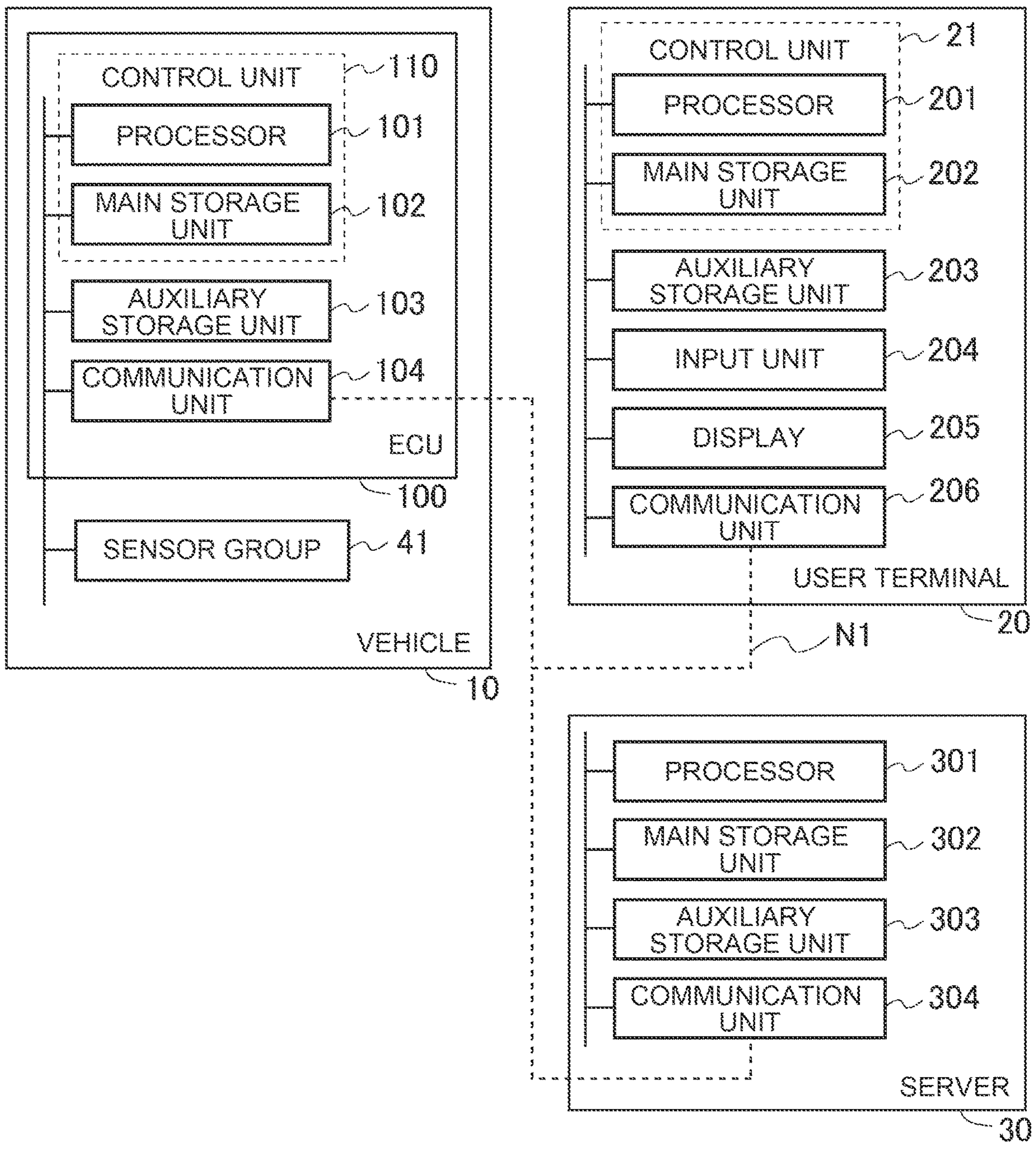
FIG. 1 is a diagram showing a schematic configuration of a system according to an embodiment.

FIG. 1 is a diagram illustrating a schematic configuration example of a system 1 according to an embodiment of the present disclosure. The system 1 is a system in which a server 30 performs a driving diagnosis based on information about traveling of a vehicle 10 and displays the result as a diagnosis report on a user terminal 20.

In the example of FIG. 1, system 1 includes vehicle 10, user terminal 20 and server 30. The user terminal 20 is, for example, a mobile terminal owned by a user. The user terminal 20 is associated with the vehicle 10 and registered in the server 30, and by using the user terminal 20, it is possible to refer to the diagnostic report created for the vehicle 10.

Vehicle 10, user terminal 20, and server 30 are interconnected by network N1. The network N1 is, for example, a worldwide public communication network such as the Internet, and may be a Wide Area Network (WAN) or other communication networks. In addition, the network N1 may include a telephone communication network such as a mobile phone network and a wireless communication network such as Wi-Fi (registered trademark).

The server 30 has a computer configuration. The server 30 has a processor 301, a main storage unit 302, an auxiliary storage unit 303 and a communication unit 304. The components are connected to each other by a bus. Note that the processor 301 is an example of a control unit.

The processor 301 is a Central Processing Unit (CPU), a Digital Signal Processor (DSP), or the like. The processor 301 controls the server 30 and performs various information processing operations. The main storage unit 302 is Random Access Memory (RAM), Read Only Memory (ROM), or the like. The auxiliary storage unit 303 is an Erasable Programmable ROM (EPROM), Hard Disk Drive (HDD), removable media, or the like. The auxiliary storage unit 303 stores an operating system (OS), various programs, various tables, and the like. The processor 301 loads the program stored in the auxiliary storage unit 303 into the work area of the main storage unit 302 and executes it, and through the execution of this program, each component is controlled. As a result, the server 30 realizes the function that matches the predetermined purpose. The main storage unit 302 and the auxiliary storage unit 303 are computer-readable recording media.

The communication unit 304 is means for communicating with the vehicle 10 and the user terminal 20 via the network N1. The communication unit 304 is, for example, a Local Area Network (LAN) interface board or a wireless communication circuit for wireless communication.

Next, the user terminal 20 will be described. The user terminal 20 is, for example, a small computer such as a smart phone, a mobile phone, a tablet terminal, a personal information terminal, a wearable computer (such as a smartwatch), or a personal computer. The user terminal 20 has a processor 201, a main storage unit 202, an auxiliary storage unit 203, an input unit 204, a display 205 and a communication unit 206. The components are connected to each other by a bus. The processor 201, the main storage unit 202, and the auxiliary storage unit 203 are the same as the processor 301, the main storage unit 302, and the auxiliary storage unit 303 of the server 30, so the explanation is omitted.

The input unit 204 is means for receiving an input operation performed by a user, such as a touch panel, mouse, keyboard, microphone, or push button. A display 205 is means for presenting information to the user, and is, for example, a Liquid Crystal Display (LCD) or an Electro Luminescence (EL) panel. The input unit 204 and the display 205 may be configured as one touch panel display. The communication unit 206 is a circuit for communicating with other devices (for example, the vehicle 10 or the server 30, etc.) via the network N1.

Next, the vehicle 10 will be described. The vehicle 10 includes an ECU 100 as an electronic control unit and a sensor group 41. These components are interconnected by a CAN bus, which is the bus of the in-vehicle network. Note that each of these components may be realized by a combination of an in-vehicle device such as a car navigation system or an in-vehicle communication device instead of a single module.

The ECU 100 has a computer configuration. The ECU 100 has a processor 101, a main storage unit 102, an auxiliary storage unit 103 and a communication unit 104. The components are connected to each other by a bus. Since the processor 101, the main storage unit 102, the auxiliary storage unit 103, and the communication unit 104 are the same as the processor 201, the main storage unit 202, the auxiliary storage unit 203, and the communication unit 206 of the user terminal 20, description thereof will be omitted.

The sensor group 41 includes, for example, sensors that detect the state of the vehicle 10 and sensors that detect the actions of the driver. The sensor group 41 includes, for example, a speed sensor, an acceleration sensor, an accelerator operation amount sensor, a steering angle sensor, a yaw rate sensor, a winker switch sensor (a sensor that detects the switch state of a direction indicator), a shift position sensor, and a position information sensor. (GPS sensor) or a brake switch. The sensor group 41 may also include a sensor that detects that a system such as pre-crash safety has been activated.

Figure 2:
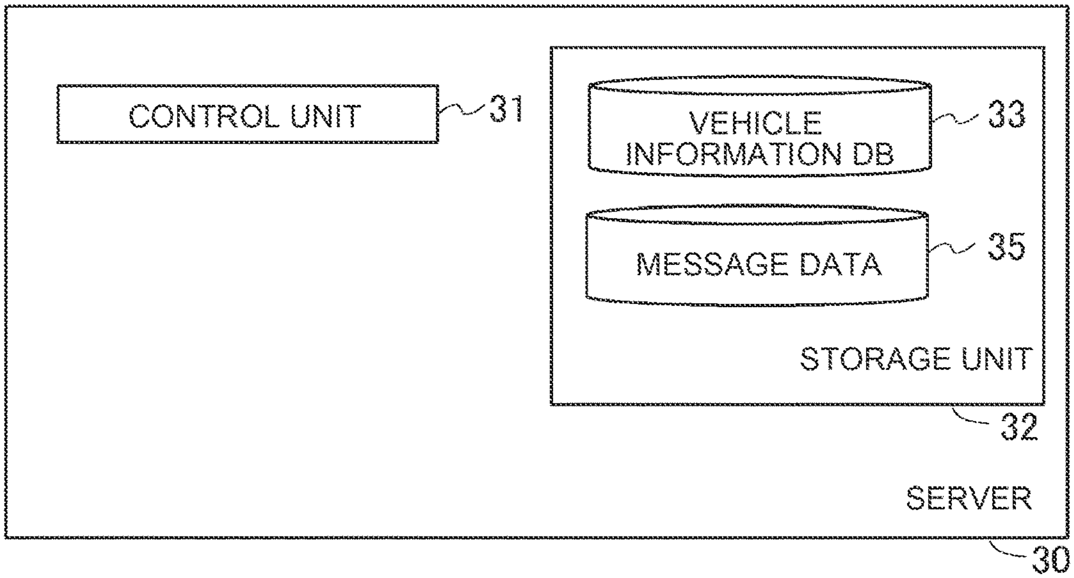
FIG. 2 is a diagram illustrating the functional configuration of a server according to the embodiment.

Next, the function of the server 30 will be described. FIG. 2 is a diagram illustrating the functional configuration of the server 30 according to the embodiment. The server 30 includes a control unit 31 and a storage unit 32 as functional components. The processor 301 of the server 30 executes the processing of the control unit 31 according to the computer program on the main storage unit 302. The storage unit 32 includes a main storage unit 302 and an auxiliary storage unit 303. The storage unit 32 stores vehicle information DB 33 and message data 35. Vehicle information DB 33 is, for example, a relational database.

The control unit 31 updates the vehicle information DB 33 upon receiving the travel information from the vehicle 10. The travel information is information related to travel of the vehicle 10, and includes, for example, detection values of the sensor group 41, travel distance of the vehicle 10, date and time of travel of the vehicle 10, and vehicle ID. The control unit 31 stores in the vehicle information DB 33 the received travel information itself, information related to predetermined behavior obtained based on the travel information, or information combining these. Hereinafter, information stored in this vehicle information DB 33 is also referred to as travel history information.

The vehicle information DB 33 includes, for example, vehicle ID, user ID, mileage, date and time of travel, route, number of times of sudden acceleration, number of times of sudden deceleration, number of times of sudden steering, number of times of overspeeding, number of short turn signals, and, Stores information about diagnostic reports. The vehicle information DB 33 is updated for each trip. Note that the travel information may be transmitted from the vehicle 10 to the server 30 for each trip, or may be transmitted from the vehicle 10 to the server 30 at predetermined time intervals.

The vehicle ID is information (vehicle ID) that can identify the vehicle 10. The user ID is information (user ID) that can identify the user associated with the vehicle 10. The traveled distance is the total traveled distance of the vehicle 10 when the trip is started. The travel date and time is the date and time when the vehicle 10 traveled. The date and time when the vehicle 10 traveled includes the date and time when the vehicle 10 was started, the date and time when the vehicle 10 was shut down, and the like. Sudden acceleration means that the speed of the vehicle 10 has increased by 6 km/h or more in 0.5 seconds, for example. Sudden deceleration means that the speed of the vehicle 10 has decreased by 7 km/h or more in 0.5 seconds, for example. A sharp steering wheel means, for example, that the angular acceleration of the steering angle has exceeded a threshold value. Overspeeding means that the vehicle 10 exceeds a predetermined speed. A short-time blinker means that the blinking time of the direction indicator is shorter than the appropriate time. For example, when the turn signal switch is ON for 2.0 seconds or less, the control unit 31 determines that the turn signal is for a short time.

It should be noted that the travel history information stored in the vehicle information DB 33 is not limited to the above information as long as it is information necessary for carrying out driving diagnosis. For example, based on the driving information, the vehicle 10 has traveled at a speed higher than the speed limit set for the road by a predetermined value or more, the vehicle 10 has not stopped for a predetermined time or longer before being reversed, or automatic braking by pre-crash safety. is activated, the vehicle 10 is reversed at a predetermined speed or more, or a combination thereof is detected as a predetermined behavior, the information related to the predetermined behavior (for example, the number of occurrences) is stored in the vehicle information DB as travel history information. 33 may be stored. Also, the information stored in the vehicle information DB 33 may be only part of the above information.

The control unit 31 sets a predetermined period as the target period of the driving diagnosis, and executes the driving diagnosis of the vehicle for a plurality of items for each target period. For example, the control unit 31 executes a driving diagnosis of the vehicle on a monthly basis. Not limited to this, the control unit 31 may execute the driving diagnosis of the vehicle using a predetermined period such as a day, a week, a month, a season, or a year. As driving diagnosis, the control unit 31 obtains a score based on, for example, the number of times a predetermined behavior is detected. A score is calculated for each item. In each item, A is the score when the number of occurrences is low, C is the score when the number of occurrences is high, and B is the intermediate score. Note that speed is represented by A and C scores, not B score. The score is obtained by converting the number of detections of a predetermined behavior when the vehicle 10 travels 100 km. For example, in the "acceleration" item, as described above, for example, when the speed of the vehicle 10 increases by 6 km/h or more in 0.5 seconds, it is detected that there has been rapid acceleration. For example, if the number of sudden acceleration detections per 100 km run of the vehicle 10 is less than 0.1 times, the score is A, and if it is 0.1 times or more and less than 1.0 times, the score is B., 1.0 times or more, the score is C. Since the score C is a score that has a relatively high correlation with the occurrence of an accident, it is preferable that the score be A or B for all items. Note that the score is not limited to A to C, and may be anything that indicates the degree of correlation that causes an accident, such as a numerical value or a character. In addition, the threshold for determining a score (score C in this example) with a relatively high correlation to the occurrence of an accident may be dynamically determined so that the number of vehicles corresponding to that score is a predetermined percentage of the total. Here, the predetermined percentage is, for example, 5% to 30%, preferably 10% to 25%, and in this embodiment, the threshold is set to 20%. Also, items to be diagnosed are not limited to sudden acceleration, sudden deceleration, sudden steering, excessive speed, and short blinkers, but may be other behaviors.

Then, when the acquisition of the travel history information in the target period is completed, for example, when the travel history information from the start date to the end date of the target period is acquired, the control unit 31 selects a plurality of items from the travel history information. A diagnosis result is obtained, and a comprehensive evaluation is determined according to the number of items for which the diagnosis result is equal to or less than a predetermined score. For example, if the number of score C items is 4 or more, the overall evaluation is D, and if the number of score C items is 3 or more and less than 4, the total evaluation is C. Also, if the number of score C items is 1 or more and less than 3, the overall evaluation is B, and if the number of score C items is zero and the number of score B is 1 or more, the overall evaluation is A, and if score C and score B are zero, that is, if all the items have a score of A, the overall evaluation is S. Note that the conditions for determining the overall evaluation are not limited to this, and may be determined according to the number of items for which the diagnostic results are equal to or less than a predetermined score.

The control unit 31 generates a diagnostic report according to the result of the driving diagnosis during the target period. The diagnostic report presents the user with, for example, a comprehensive evaluation of the diagnosis, a message notifying that a predetermined behavior has occurred, and advice for improving the overall evaluation. In this case, based on the travel history information, the control unit 31 obtains an item in which a predetermined behavior has occurred, and reads, "Sudden braking was detected XX times.", and the number of times of the predetermined behavior is added to the diagnostic report as a message to notify the user of the predetermined behavior.

Further, when the number of items whose scores are equal to or less than a predetermined score is equal to or greater than a predetermined number, the control unit 31 adds an evaluation result (advice) for prompting improvement of the overall evaluation to the diagnosis report. For example, when the number of items with a score of C is 3 or more, that is, when the overall evaluation is C or less, the control unit 31 asks for advice prompting improvement of the overall evaluation, and generates a diagnostic report including this advice. For example, this advice is "If you improve the sudden braking, the overall evaluation will go up to B.", which includes the target comprehensive evaluation (target evaluation) and the items to be improved. For example, based on the comprehensive evaluation (current evaluation) of the target period, the control unit 31 sets the comprehensive evaluation one level higher as the target evaluation. Further, the control unit 31 compares, for example, the conditions of the current evaluation and the conditions of the target evaluation, and obtains the conditions for the target evaluation from the current evaluation. For example, if the current evaluation is C and there are three items with a score of C, reducing (improving) the number of items with a score of C by one is the condition for changing the current evaluation to the target evaluation. Then, the control unit 31 extracts one item with a score of C in the current evaluation, includes this item in the advice as an item to be improved, and generates a diagnosis report. Furthermore, the control unit 31 may generate a selection button for displaying the evaluation result of the item to be improved together with the advice. Further, the control unit 31 may obtain the travel distance and the fuel consumption of the vehicle 10 from the travel history information in the target period, and add them to the diagnostic report.

After generating the diagnostic report, the control unit 31 notifies the user terminal 20 of the generation of the diagnostic report. The user who has received the notification information causes the display 205 to display the notification image. This notification image includes, for example, a message to the effect that a diagnostic report has been created, and a selection button for viewing the diagnostic report. The message to the effect that the diagnostic report has been created may include information indicating the period covered by the driving diagnosis, such as "XX month". The message may also include a prompt to view the diagnostic report. The selection button (software key) is an option for displaying the diagnostic report, and when selected by the user, the user terminal 20 executes an application for displaying the diagnostic report and requests the diagnostic report from the server 30.

Figure 3:
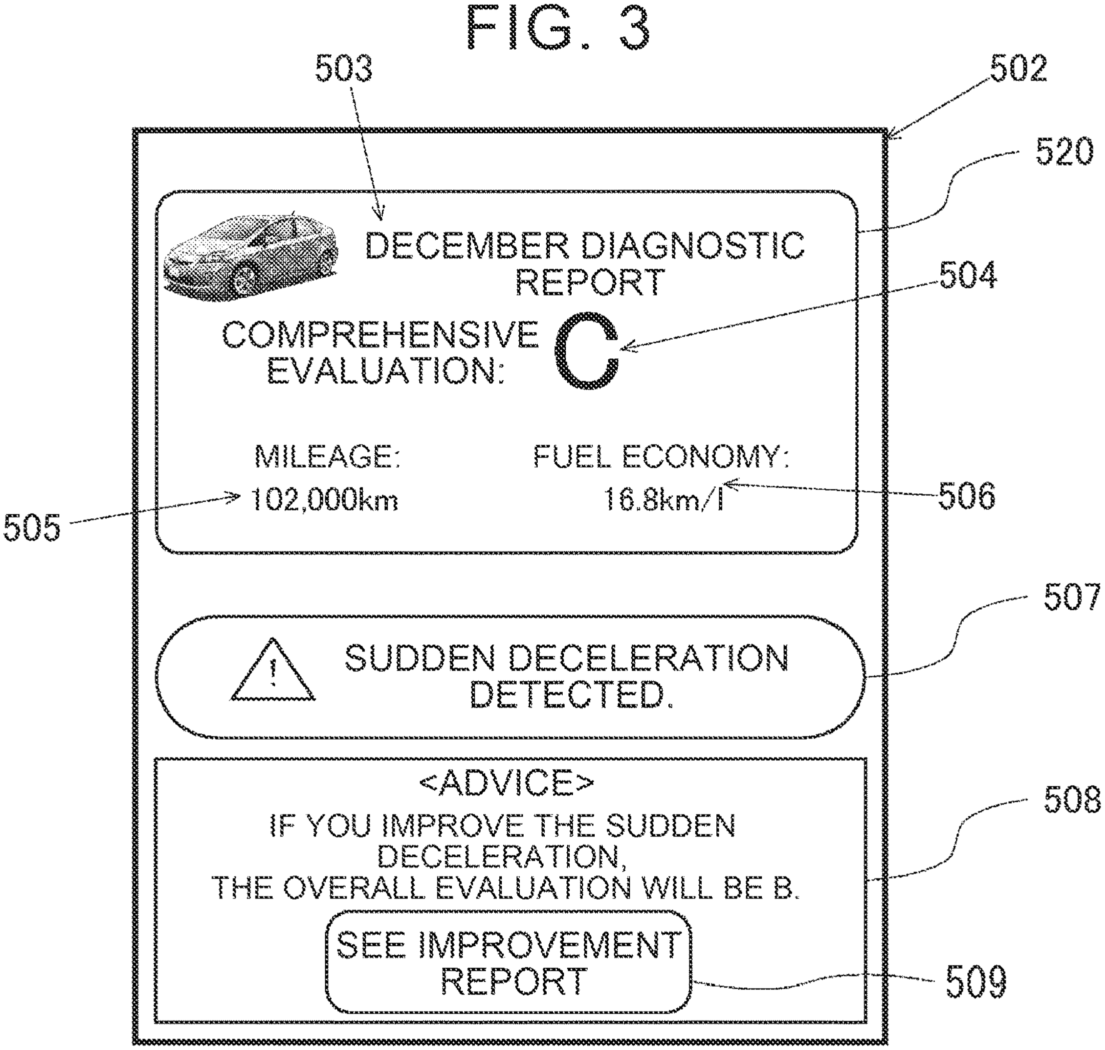
FIG. 3 is a diagram showing an example of the initial screen.

Further, when a diagnostic report is requested from the user terminal 20, the control unit 31 transmits the diagnostic report to the user terminal 20. Thereby, the control unit 31 causes the user terminal 20 to display the diagnostic report. On the other hand, the user terminal 20 displays the received diagnosis report on the initial screen of the user interface that displays the results of the driving diagnosis. FIG. 3 is a diagram showing an example of the initial screen 502. The initial screen 502 is a screen that is displayed first when an application for displaying the results of driving diagnosis is started on the user terminal 20. This initial screen 502 is displayed when the select button is selected.

The initial screen 502 includes, for example, an evaluation period 503, a comprehensive evaluation 504, a traveling distance 505, a fuel efficiency 506, a message 507, and an advice 508. The evaluation period 503 is displayed as, for example, "Diagnostic report in December" and indicates the period during which the driving evaluation was performed. Not limited to this, the evaluation period 503 may indicate the start date and end date of the evaluation period, such as "Dec. 1, 2022 to Dec. 31, 2022".

A comprehensive evaluation 504 indicates an evaluation value obtained based on a plurality of items in the driving history information of the evaluation period 503, such as "comprehensive evaluation C". In this embodiment, the control unit 31 obtains and displays one comprehensive evaluation from a plurality of items, but may obtain and display a plurality of comprehensive evaluations. For example, the control unit 31 may obtain a comprehensive evaluation of safety from a plurality of items related to safety and a comprehensive evaluation of economy from a plurality of items related to economy, and display them.

A traveling distance 505 and fuel consumption 506 indicate the traveling distance and fuel consumption of the vehicle 10 during the evaluation period. The control unit 31 obtains the mileage and fuel consumption of the vehicle 10 based on the driving history information during the evaluation period, and displays them in the diagnosis report. Note that the travel distance 505 and the fuel efficiency 506 are not essential elements and may be omitted.

An area 520 including the evaluation period 503, the comprehensive evaluation 504, the traveling distance 505, and the fuel efficiency 506 functions as an option that, when tapped by the user, moves to a page of a diagnostic report showing evaluations for each of multiple items. An option such as a selection button for moving to the diagnostic report page may be separately provided.

The message 507 may be, for example, "Sudden deceleration detected". By displaying the detected predetermined behavior like, the user can be notified that the predetermined behavior has been detected. This portion with reference numeral 507 may also function as a selection button that, when tapped by the user, moves to the corresponding diagnostic report page.

The advice 508 is, for example, "If the rapid deceleration is improved, the comprehensive evaluation will be B.", to inform the user of the items that should be improved in order to raise the overall evaluation, and prompt the user to improve the overall evaluation. A selection button 509 is an option for displaying evaluation results of items to be improved.

Figure 4:
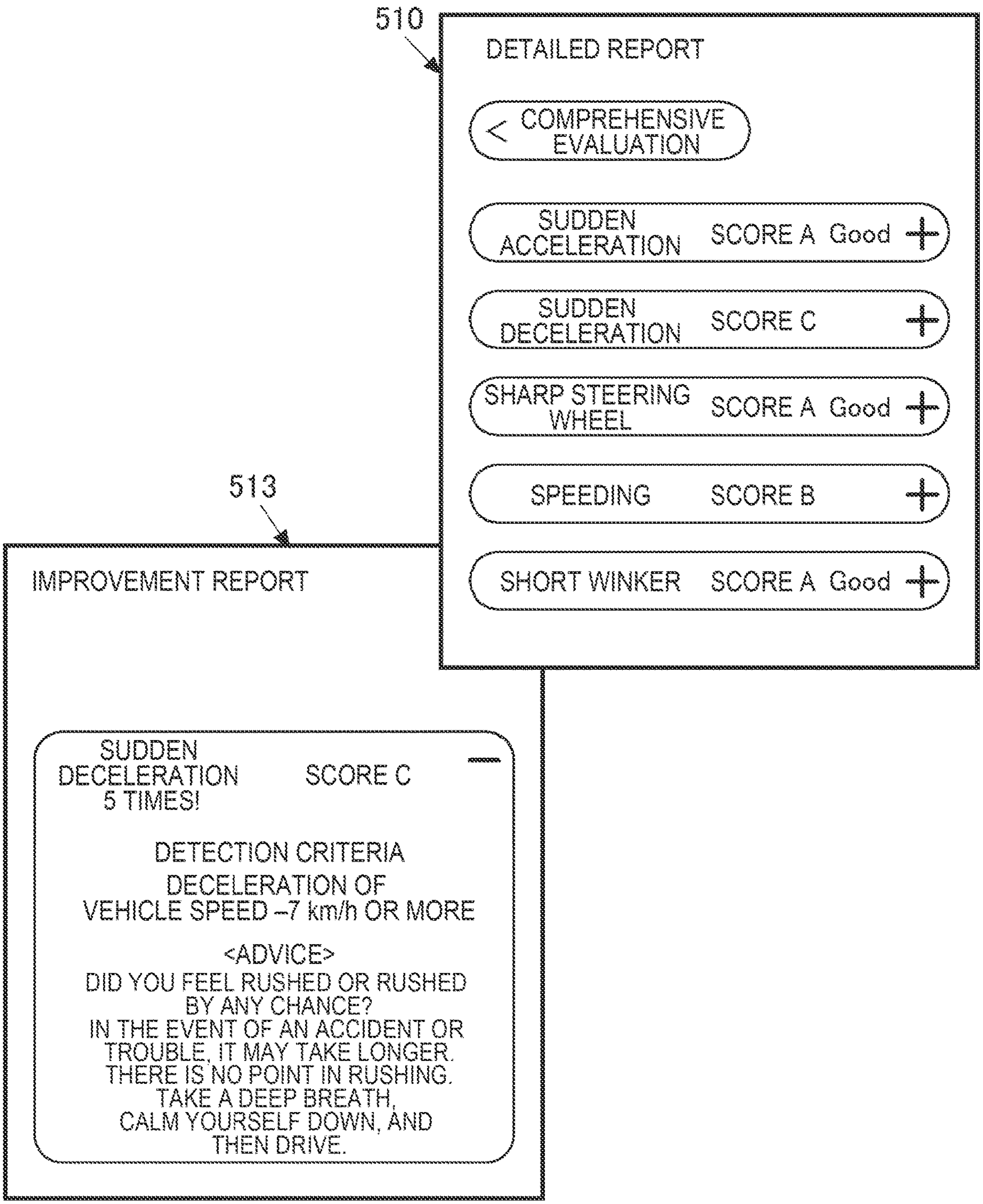
FIG. 4 is a diagram showing an example of a detailed report showing evaluations for multiple items.

FIG. 4 is a diagram showing an example of a detailed report 510 showing evaluations for each of multiple items. This detailed report 510 is, for example, a screen that is opened when the area 520 as an option on the initial screen 502 is selected. That is, detailed report 510 is a screen associated with initial screen 502. The example shown in FIG. 4 shows a detailed report in which C indicates sudden deceleration (sudden braking), B indicates excessive speed, and A indicates other items. As a result, the results of all evaluation items can be presented to the user.

In addition, the control unit 31 may generate an evaluation report (improvement report) 513 by extracting only the items to be improved (improvement items), without being limited to showing the evaluation of all the items. This improvement report 513 is, for example, a screen opened when the selection button 509 as an option on the initial screen 502 is selected. That is, the improvement report 513 is a screen associated with the initial screen 502. When the selection button 509 is selected by the user and an improvement report is requested from the user terminal 20, the control unit 31 extracts the items whose scores are equal to or less than a predetermined score, and creates an improvement report 513 including these items (improvement items). It should be noted that the selection button 509 is displayed on the initial screen 502 when the number of items whose score is equal to or less than a predetermined score among a plurality of items is equal to or greater than a predetermined number, for example, when the overall evaluation is C or less. For this reason, the improvement report 513 is also generated when the number of items with a predetermined score or less is a predetermined number or more. Since the improvement report 513 does not include items whose score is not equal to or lower than a predetermined score among the plurality of items, displaying the improvement report 513 allows the user to easily understand the items to be improved.

Next, functional components of the ECU 100 of the vehicle 10 will be described. The ECU 100 includes a control unit 110 as a functional component. The processor 101 of the ECU 100 executes the processing of the control unit 110 according to the computer program on the main storage unit 102.

The control unit 110 transmits information about each detection value of the sensor group 41 to the server 30 every predetermined time or every trip. At this time, the vehicle ID, position information, time information, and other information necessary for driving diagnosis are transmitted together as driving information.

Next, functions of the user terminal 20 will be described. The user terminal 20 has a control unit 21 as a functional component. The processor 201 of the user terminal 20 executes the processing of the control unit 21 according to the computer program on the main storage unit 202. The user terminal 20 is installed with an application that can refer to the diagnostic report.

The control unit 21 of the user terminal 20 receives from the server 30 the notification that the diagnostic report has been created. This notification is, for example, a push notification, a short message service (SMS) notification, or an email notification. This notification may include an instruction to display on display 205 that a diagnostic report has been created.

In addition, when the user selects the selection button, the control unit 21 activates an application that can refer to the diagnostic report. When the application is activated by the control unit 21, the initial screen 502 shown in FIG. 3 is displayed. At this time, the control unit 21 accesses the server 30 and requests information necessary for displaying the initial screen 502.

Further, when the user taps the location indicated by the area 520 on the initial screen 502, the control unit 21 displays the detailed report 510 shown in FIG. 4. At this time, the control unit 21 accesses the server 30 and requests information necessary for displaying the detailed report 510. Furthermore, when the user taps the selection button 509 on the initial screen 502, the control unit 21 displays an improvement report 513. Information required for display at this time is also requested from the server 30.

Figure 5:
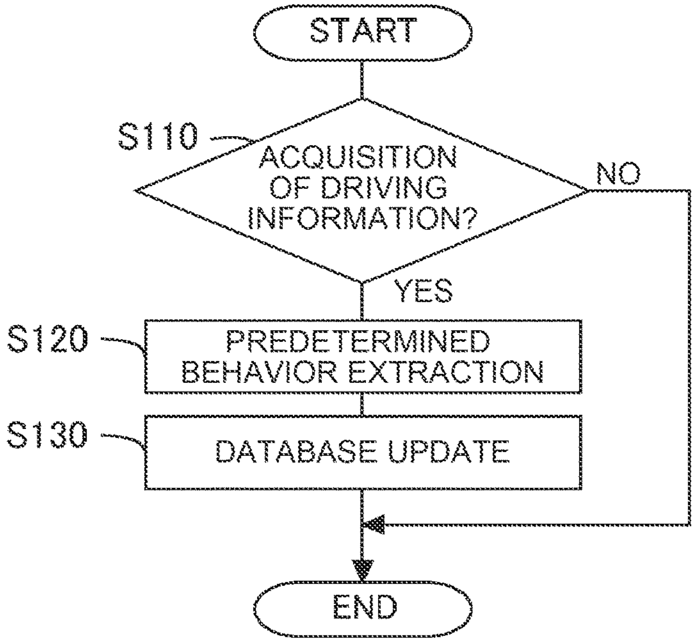
FIG. 5 is a flowchart of processing for accumulating travel information in the server according to the embodiment.

Next, processing for notifying a diagnostic report in the server 30 will be described. FIG. 5 is a flowchart of processing for accumulating travel history information in the server 30 according to the embodiment. The processing shown in FIG. 5 is executed in the server 30 for each trip.

In S110, the control unit 31 determines whether travel information has been received from the vehicle 10. The travel information may be transmitted from the vehicle 10, for example, when the vehicle 10 is shut down (may be IG-OFF), or may be transmitted from the vehicle 10 at predetermined time intervals. If the determination in S110 is affirmative, the process proceeds to S120, and if the determination is negative, the process ends.

At S120, the control unit 31 extracts a predetermined behavior. Based on the detection values of the sensor group 41, the control unit 31 determines whether or not there is a predetermined behavior. Then, in S130, the control unit 31 stores travel history information such as the number of times the predetermined behavior is detected in the vehicle information DB 33 and updates the vehicle information DB 33 according to the predetermined behavior.

Figure 6:
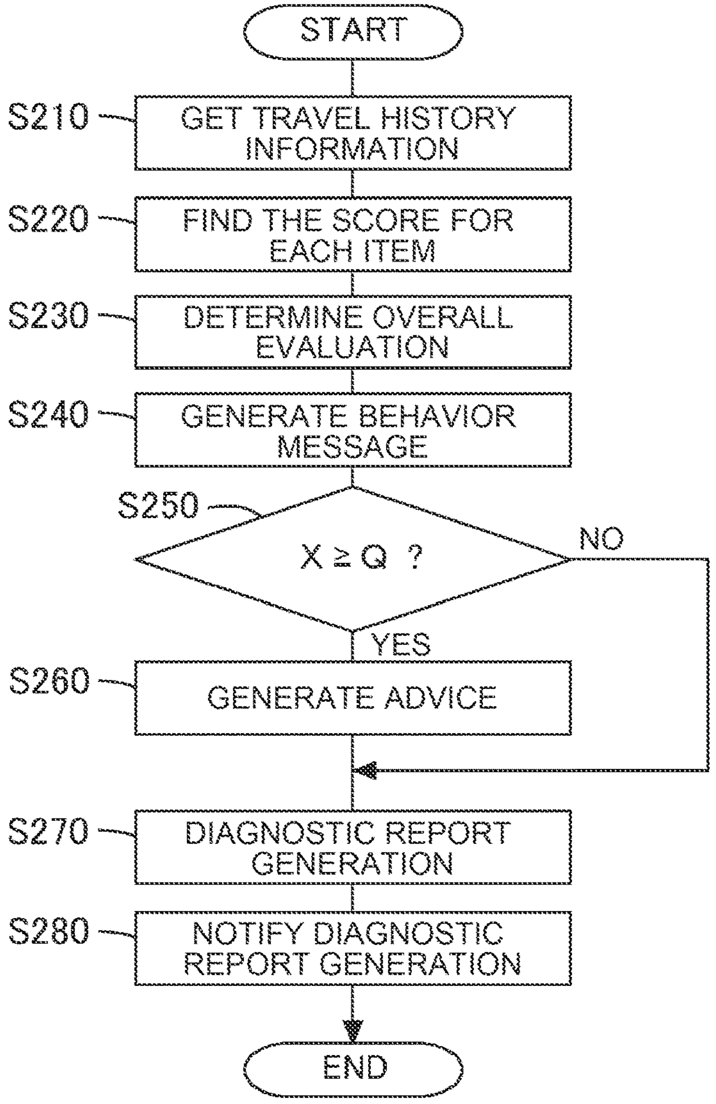
FIG. 6 is a flowchart of diagnostic report notification processing in the server according to the embodiment.

FIG. 6 is a flowchart of processing for generating a diagnostic report in the server 30 according to the embodiment. The processing shown in FIG. 6 is executed in the server 30 every predetermined period (target period).

In S210, the control unit 31 acquires the travel history information of the vehicle 10 during the target period from the vehicle information DB 33. At S220, the control unit 31 executes driving diagnosis of the vehicle for a plurality of items based on the travel history information acquired at S210, and obtains a score for each of the plurality of items. For example, the control unit 31 obtains scores A to C for each item based on the number of times a predetermined behavior is detected. In S230, the control unit 31 determines a comprehensive evaluation according to the number of items with a predetermined score or less among the plurality of items. In S240, the control unit 31 generates a message (behavior message) that informs the user that a predetermined behavior has occurred. For example, based on the travel history information, the control unit 31 generates, as a behavior message, information including an item in which a predetermined behavior has occurred.

In S250, the control unit 31 determines whether or not the number X of items with a predetermined score or less is a predetermined number Q or more. For example, the control unit 31 determines whether the number of items with a score of C or less is 3 or more, that is, whether the comprehensive evaluation is C or less. In S250, if the determination is negative, the control unit 31 proceeds to S270, and if the determination is affirmative, the control unit 31 proceeds to S260. In S260, the control unit 31 generates an advice prompting improvement of the comprehensive evaluation.

In S270, the control unit 31 generates a diagnostic report. The diagnostic report includes a comprehensive evaluation and messages announcing that certain behaviors were detected. Also, if it is determined in S250 that the number of items with scores below the predetermined number is above the predetermined number, advice is added to the diagnosis report.

In S280, the control unit 31 notifies the user terminal 20 that a diagnostic report has been created. When the user terminal 20 presents the notification to the user and the user selects an option to display the diagnostic report in the notification, the user terminal 20 requests the server 30 for information for displaying the diagnostic report. When receiving this request, the control unit 31 transmits the information of the diagnostic report generated in S270 to the user terminal 20 for display. Similarly, when information for displaying the detailed report 510 or information for displaying the improvement report 513 is requested, the control unit 31 transmits the information for the detailed report 510 or the information for the improvement report 513 to the user terminal 20 to cause the information to be displayed.

As described above, the information processing device of the present embodiment executes vehicle driving diagnosis for a plurality of items in a predetermined period, determines a comprehensive evaluation based on the score of each item, and displays it on the initial screen. Thereby, the information processing device of the present embodiment can provide the user with a diagnostic report when the user drives the vehicle. In addition, the information processing device of the present embodiment can present the diagnosis results in an easy-to-understand manner for the user by displaying the comprehensive evaluation first, instead of displaying the evaluation results of a plurality of items at once. Furthermore, the information processing device of the present embodiment displays evaluations for each of the plurality of items on another screen associated with the initial screen. Therefore, the information processing device of the present embodiment can display the evaluation for each item as necessary, and can improve usability.

Other Embodiments

The above-described embodiments are merely examples, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. For example, vehicle 10 may have some or all of the functions of server 30.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-temporary computer-readable storage media include, for example, magnetic discs (floppy (registered trademark) discs, HDD, etc.), optical discs (Compact Disc (CD)-ROM, Digital Versatile Disc (DVD), Blu-ray discs, etc.). Includes disks of any type, ROM, RAM, EPROM, EEPROM, magnetic cards, flash memory, optical cards, and any type of medium suitable for storing electronic instructions.

What is claimed is:

1. An information processing system comprising:

a server including a first processor; and a user terminal including a second processor, wherein the first processor is configured to execute a process of evaluating a user's driving of a vehicle for a predetermined period of time for a plurality of items and obtain a score for each of the items, determine a comprehensive evaluation depending on, among the items, the number of items having a predetermined score or less in a result of the process of evaluating the user's driving of the vehicle, generate a diagnostic report including the comprehensive evaluation, and transmit information of the generated diagnostic report to the user terminal, the second processor is configured to display the comprehensive evaluation included in the diagnostic report and an option on an initial screen of a user interface in response to receiving the information of the generated diagnostic report from the first processor, and request evaluation information from the server, the evaluation information being information to be displayed for each of the items on a second screen of the user interface, in response to selection of the option displayed on the initial screen, the first processor is further configured to transmit the evaluation information to the user terminal in response to receiving the request for the evaluation information from the user terminal, and the second processor is further configured to display an evaluation for each of the items on the second screen that is different from the initial screen in response to receiving the evaluation information from the first processor.

2. The information processing system according to claim 1, wherein:

the diagnostic report includes an advice for prompting improvement of the comprehensive evaluation, when, among the items, the number of the items having the predetermined score or less is equal to or greater than a predetermined number; and the second processor is configured to display the advice on the initial screen of the user interface with the comprehensive evaluation.

3. The information processing system according to claim 1, wherein the first processor is further configured to extract an item with the predetermined score or less, when, among the items, the number of the items having the predetermined score or less is equal to or greater than a predetermined number, and in response to receiving the request for the evaluation information from the user terminal, transmit, to the user terminal, the information to display, on the second screen, the item with the predetermined score or less to be displayed as the evaluation information.

4. The information processing system according to claim 1, wherein the second processor is further configured not to display the option on the initial screen of the user interface, when, among the items, the number of the items having the predetermined score or less is smaller than a predetermined number.

5. The information processing system according to claim 1, wherein:

the user terminal is installed with an application for referring to the diagnostic report; and the initial screen is displayed first in response to the application is activated.

6. The information processing system according to claim 1, further comprising a memory storing vehicle information database, wherein the first processor is further configured to:

receive travel information from the vehicle;

store, in the vehicle information database, travel history information that is based on the travel information in the vehicle information database;

acquire the travel history information from the vehicle information database for the predetermined period of time; and execute the process of evaluating the user's driving of the vehicle based on the acquired travel history information.

7. An information processing method executed by a server and a user terminal, the information processing method comprising:

executing, by the server, a process of evaluating a user's driving of a vehicle for a predetermined period of time for a plurality of items and obtaining a score for each of the items;

determining, by the server, a comprehensive evaluation depending on, among the items, the number of items having a predetermined score or less in a result of the process of evaluating the user's driving of the vehicle;

generating, by the server, a diagnostic report including the comprehensive evaluation;

transmitting, by the server, information of the generated diagnostic report to the user terminal;

displaying, by the user terminal, the comprehensive evaluation included in the diagnostic report and an option on an initial screen of a user interface in response to receiving the information of the generated diagnostic report from the server, requesting, by the user terminal, evaluation information from the server, the evaluation information being information to be displayed for each of the items on a second screen of the user interface, in response to selection of the option displayed on the initial screen;

transmitting, by the server, the information for displaying the evaluation for each of the items to the user terminal in response to receiving the request for the evaluation information from the user terminal; and displaying, by the user terminal, an evaluation for each of the items on the second screen that is different from the initial screen in response to receiving the evaluation information from the server.

* * * * *